March 21, 1933.  W. H. SELTZER  1,902,423
FLOWER HOLDING DEVICE
Filed April 14, 1932
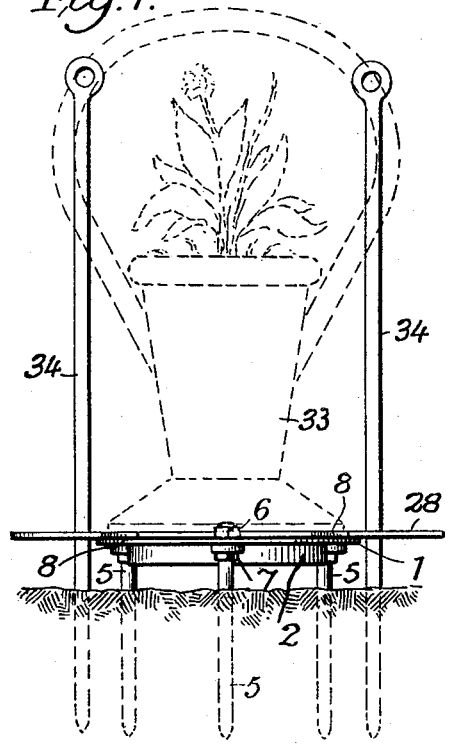
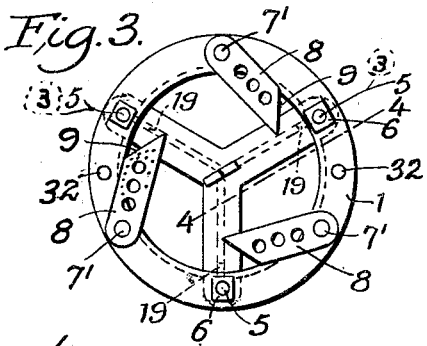
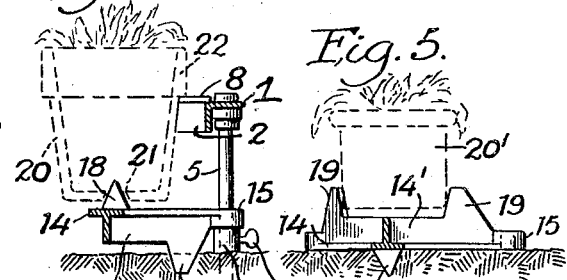
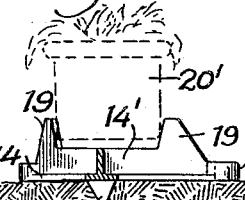
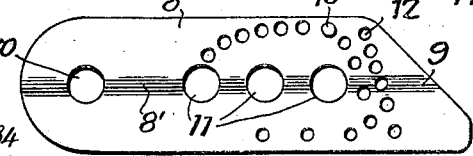
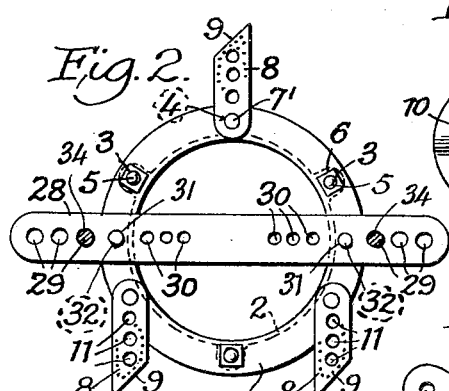
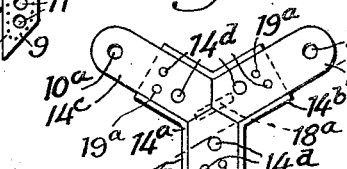
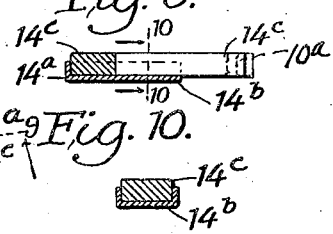
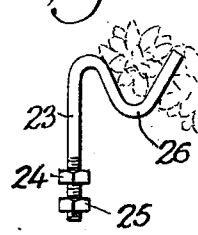
Inventor:
William H. Seltzer.
By C. C. Hines,
Attorney.

Patented Mar. 21, 1933

1,902,423

UNITED STATES PATENT OFFICE

WILLIAM H. SELTZER, OF LEHIGHTON, PENNSYLVANIA

FLOWER HOLDING DEVICE

Application filed April 14, 1932. Serial No. 605,335.

This invention relates to a flower holding device, and particularly to a device for holding a wreath or a pot, basket, jar, bottle, crock or other receptacle for holding flowers for display, as in a cemetery or other outdoor or indoor place.

The object of the invention is to provide a flower holding device which may be used to hold a wreath in a recumbent or inclined position or to support a receptacle of any of the kinds above stated in a firm and substantial manner and against any liability of displacement by the wind.

The invention consists of the features of construction, combination and arrangement of parts, hereinafter fully described and claimed, reference being had to the accompanying drawing, in which:—

Fig. 1 is a side elevation showing the device as used for supporting a flower basket.

Fig. 2 is a sectional plan view of the same, omitting the basket.

Fig. 3 is a view similar to Fig. 2, omitting parts shown in Fig. 2 and showing the swinging arms swung inward as for use in clamping or assisting in holding a basket, jar or other receptacle in position.

Fig. 4 is a sectional view, taken on the plane indicated by line 4—4 of Fig. 3, through the holder as shown in Fig. 3, showing the central lug or spur of the armed supporting frame employed for centering a flower pot in position.

Fig. 5 is a view similar to Fig. 4, showing the supporting frame in reversed position and as used for centering a jar or other like receptacle in position.

Fig. 6 is a view of one of the swinging arms on an enlarged scale.

Fig. 7 is a view of a hooked basket attachment or bracket rod used for holding a wreath in an inclined position.

Fig. 8 is a top plan view of a modified form of armed supporting frame.

Fig. 9 is a section on line 9—9 of Fig. 8.

Fig. 10 is a section on line 10—10 of Fig. 9.

Fig. 11 is a view of a modified form of supporting leg.

Fig. 12 is a view similar to Fig. 9, showing another modified form of supporting frame.

In carrying my invention into practice I provide a flower holding device comprising a frame ring, preferably of angle metal, and comprising a horizontal ring body 1 having a depending flange 2, which ring may be cast, pressed or forged and made of any suitable metal. This ring is provided with sets of openings 3 and 4, respectively, of two or more in each set, three openings being shown in each set in the present instance.

The openings 3 are designed to receive the upper threaded ends of an equivalent number of equally spaced supporting legs or anchor rods 5 which are secured in position upon the ring by means of upper and lower securing nuts 6 and 7. The lower ends of these legs or rods are pointed so that they may be easily driven or forced into the ground to support the ring at a desired level above the surface of the ground. The openings 4 are designed to receive bolts 7' for pivotally connecting to the ring adjustably mounted swinging clamping or holding arms 8 arranged in spaced relation and at suitable points above the ring. Each arm 8 has a beveled outer end 9 and is provided at its inner end with an opening 10 and between its beveled end and the opening 10 is provided with a series of openings 11. The arms 8 are employed for holding or to assist in holding a wreath or flower receptacle, as hereinafter described. Each arm 8 may further be provided with a desired number and arrangement of keeper openings 12 to receive a locking pin 13.

Disposed beneath the ring 1 is a base support 14 comprising a stand composed of a series of angle metal arms 14' radiating at equal angles from a common center, each arm being preferably T-shaped in cross section. The arms 14' which are integrally connected at their inner ends, and preferably cast or otherwise formed as a unitary structure, are provided at their outer ends with eyes 15 slidably engaging the rods 5 and adapted to rest on sleeves 16 also slidably engaging the rods, which sleeves are adapted to be fastened in position by set screws 17. The support 14 is reversible side for side on the rods, that is to say, either the top side of the support, as shown in Fig. 4, or the bottom side of the support, as shown in Fig. 5, may be turned upward or disposed in an uppermost position. The top side of the support is provided at the center of said support, namely, at the point of intersection of its arms 14, with a centering or anchoring projection or spur 18, which is preferably of inverted V-shape, while the bottom of the frame is provided at the outer end of each of its arms 14', or at desired points between the inner and outer ends of its arms, with tapered holding projections, lugs or spurs 19.

The flower holder, constructed as thus far described, is adapted for use in holding a wreath or other like floral piece in recumbent position or for supporting a basket, pot, jar, crock or other like receptacle containing flowers. A wreath or like floral piece to be supported and laid in recumbent position upon the ring 1 may be secured thereto, against possibility of displacement, by cord or wire ties passed through proper openings 11 in the arms 8, with the arms extending outwardly beyond the ring, as shown in Fig. 2, and fastened securely in such position. The series of openings 11 in this case permit of wreaths or floral pieces of different diameters being supported and secured in position. If a pot, jar or like receptacle is to be supported, such receptacle is passed down through and fitted within the ring 1 and supported at its base upon the support 14. If the receptacle is of that type having an external annular shoulder near its top, the arms 8 may be swung inwardly and secured in position to engage under such shoulder to hold the receptacle from outward displacement or lateral movement. Where the receptacle is unprovided with such a shoulder, the arms 8 may be swung inwardly, after being adjustably secured to the ring by their pivot bolts, to suit the diameter of the receptacle, and then disposed so as to bring their beveled ends 9 in clamping engagement with the sides of the receptacle and the arms then fastened against movement by tightening up their binding nuts. The support 14 may be disposed in the position shown in Fig. 4 with its spur 18 projecting upwardly and its spurs 19 projecting downwardly and embedded in the ground, where the receptacle to be secured is, as shown, a pot 20 having an opening 21 in its bottom, which opening 21 may be employed to receive the spur 18, whereby the bottom of the pot will be held centered and against lateral displacement. The receptacle 20 in this instance is shown as having an external shoulder 22 beneath which the arms 8 are engaged to hold the top of the pot against lateral movement and to assist in supporting the pot in position. For supporting other similar receptacles the support 14 may be arranged in the reverse position shown in Fig. 5, in which its spur 18 projects downwardly and is embedded in the ground and its spurs 19 extend upward so as to act as shoulders to bear against the sides of a receptacle 20' to hold the bottom of said receptacle from displacement. The receptacle 20' may be a flower holding bottle, jar, vase or other like receptacle which may be suitably engaged by the arms 8 to support it at the top against movement in any direction.

It will be understood that the arms may be applied to the frame ring to hold receptacles varying in diameter by engagement of its pivot pin or bolt with the opening 10 or one or the other of the openings 11, and in practice the pivot pin or bolt may be provided with a binding nut or other binding means to hold it in adjusted position. For the purpose of obtaining greater security, however, I preferably provide each arm 8 with a suitable number and arrangement of the openings 12 to receive a locking pin 13, which may consist in practice of a small wire nail, so that by engagement of the pin with one of such openings so as to bring the pin into engagement with the inner flange or periphery of the ring, the arm will be locked in holding position against outward displacement. For the purpose of obtaining still further security against shifting of the arms 8 when in holding position, I may provide each arm 8 with an angle portion or ridge 8' to increase its frictional engagement with the ring 1. As before stated, any of the openings 11 may be employed to secure tie cords or wires, whereby a wreath or floral piece may be secured to the holder. Any opening 10 or 11 in any of the arms 8 may also be employed to receive the lower threaded end of a bracket rod 23, adapted to be fastened in position thereon by nuts 24 and 25 having at its upper end an angularly bent or hooked portion 26 of suitable size and shape to receive and engage part of a wreath or other floral piece 27, whereby a wreath may be supported and displayed in an inclined position, in which position it may be suitably fastened to the bracket 23 on one of its supporting arms 8 and to the other supporting arms.

A flower basket may be supported in position as previously described, by resting it on the ring and fastening it to the holding arms by suitable securing ties, but I also provide a means whereby baskets of all sizes may be more firmly and securely supported in place when desired or required. To this end, I provide a holding bar 28 adapted to be extended diametrically across the top of the ring 1, and which is of greater length than the diameter of the ring so that its ends will project beyond opposite sides of the ring. This bar is provided at each end with an outer row or series of openings 29, an inner row or series of openings 30 and intermediate openings 31. The openings 31 are designed to register with openings 32 in the ring 1 for the reception of pins or bolts to detachably connect the bar with the ring. The openings 30 may be used for a similar purpose in applying the bar to rings of smaller diameters or to receive fastening ties for attaching the bottom of the basket 33 to the support. The holes 29 are of suitable size for passage of a holding staff or rod 34, one of which may be passed downward through an opening 29 at each side of the holder and driven in the ground to give greater stability to the support, and to enable the handle or upper part of the basket 33 to be tied or otherwise fastened thereto, so that baskets of even the largest size may be firmly secured in place against any possibility of being overturned or dislodged by the wind even in stormy weather. The series of holes 29 permit of the placing of the staffs 34 close to or at a distance from the sides of the ring according to the size or diameter of the basket which is to be supported. The arms 8 in this use of the device may serve as extended supports for the base of the basket and as holding elements to which the base of the basket may also be tied.

In Figs. 8, 9 and 10 I have shown a modified form of support 14a in which such support comprises a cast or sheet metal body having radiating portions 14b which are flanged or of channeled form to receive wooden arms 14c secured thereto by screws, bolts or rivets 14d. One side of the metal body is provided with a centering spur 18a similar to spur 18 and each wooden arm 14c is provided with a screw, nail or like projection 19a to perform the function of the spur 19 as hereinbefore described. The arms 14c are provided at their outer ends with openings 10a to slidably engage the legs or supports 5. The use of this form of support will be apparent from the foregoing description.

It is desirable to provide means to hold the support elevated where the support is not disposed directly upon the earth but upon a hard or paved surface into which anchor members, such as the pointed legs or rods 5, cannot be driven. To this end, I may employ legs or supporting members 5a, as shown in Fig. 11, each comprising a rod having a headed upper end to engage the openings 3 and nuts 6a and 7a to secure the same to the frame ring, said rod having its lower end bent at a right angle to provide a supporting foot 5b. By employing the legs 5a of this form in place of the legs 5, the feet 5b of which legs will rest upon the surface on which the support is to be placed, the support may be securely sustained on any kind of surface, as will be readily understood.

In Fig. 12 the construction is similar to that of Figs. 8, 9 and 10 except that a wood filler 14e is substituted for each wooden arm 14c and each radiating portion 14f of the support is extended, as at 14g beyond the outer end of the filler 14e and is provided with an opening 10b to serve the purpose of opening 10a above described.

From the foregoing description, taken in connection with the accompanying drawing, the construction, mode of use and advantages of my invention will be readily understood, and it will be seen that a type of flower holder for use in cemeteries, etc., is provided whereby wreaths or floral pieces and all kinds of flower holding receptacles may be supported in position for attractive display and yet firmly held against the possibility of being overturned or otherwise displaced by wind or rain in stormy weather. While the construction disclosed is preferred, it will, of course, be understood that changes in the form, arrangement and proportion of parts may be made, within the scope of the appended claims, without departing from the spirit or sacrificing any of the advantages of the invention.

What I claim is:—

1. A flower holding device comprising a frame ring, supporting members carried by the frame ring to support said ring in an elevated position, and a reversible support disposed below the frame ring and adjustably engaging said supporting members, said support having differently positioned flower holder engaging and ground engaging devices on the opposite faces thereof.

2. A flower holding device comprising a frame ring, supporting members depending from the frame ring to support said frame ring above the ground surface, a reversible support slidably mounted on said supporting members and having differently positioned flower holder engaging and ground engaging devices on the opposite faces thereof, and means for securing the same in adjusted position to the supporting members.

3. A flower holding device comprising a frame ring, supporting members carried by the frame ring to support said ring above the ground surface, and a reversible support detachably and adjustably engaging said supporting members, said support having on its opposite faces receptacle engaging projections respectively disposed at the center thereof and between the center and periphery thereof.

4. A flower holding device comprising a frame ring, supporting members carried by the frame ring to support said ring above the ground surface, and a reversible support detachably and adjustably engaging said supporting members, said support having on its opposite faces receptacle engaging projections respectively disposed at the center thereof and between the center and periphery thereof, said projections being pointed and adapted to be driven into the ground to serve as anchoring members.

5. A flower holding device comprising a frame ring, supporting members carried by the frame ring to support said ring above the ground surface, a support carried by said supporting members below the frame ring, said support being reversible and provided on opposite sides thereof with means for engaging the sides of the base or the center hole in the bottom of a flower pot and means carried by the frame ring for engaging and holding the upper portion of the pot.

6. A flower holding device comprising a frame ring, supporting members carried by and depending from the frame ring to support said ring above the ground surface, a support adjustably mounted on said supporting members below the frame ring, and means adjustably mounted on the frame ring for securing a flower holder thereto.

7. A flower holding device comprising a frame ring, supporting members carried by the frame ring and adapted to be driven into the ground to support said frame ring above the ground surface, a support adjustably mounted on the supporting members below the frame ring, and means adjustably mounted on the frame ring for securing a flower holder thereto.

8. A flower holding device comprising a frame ring, means carried by the frame ring for supporting the same from the ground, a support adjustably mounted on the supporting means below the frame ring, and pivotally mounted adjustable clamping members carried by the frame ring to secure a flower receptacle thereto.

9. A flower holding device comprising a frame ring, supporting members carried by the frame ring for supporting the same from the surface of the ground, and swinging arms mounted on the frame ring for securing a flower holder thereto, each arm having a beveled free end portion and provided with perforations for adjustable fastening engagement with the frame ring.

10. A flower holding device comprising a frame ring, supporting members carried by the frame ring for supporting the same from the surface of the ground, and swinging arms mounted on the frame ring for securing a flower holder thereto, each arm having perforations therein for adjustable fastening engagement with the frame ring and other perforations therein for the reception of a locking member to adjustably lock the same in holding position to the frame ring.

11. A flower holding device comprising a frame ring, supporting members carried by the frame ring for supporting the same from the ground, a support arranged below and mounted on the supporting members for adjustment with relation to the frame ring, and perforated holding members pivotally and adjustably connected to the frame ring.

12. A flower holding device comprising a frame ring, supporting members for supporting the frame ring from and in spaced relation to the ground, swinging engaging members carried by the frame ring, and a bracket member adapted to be engaged with one of said engaging members and having a portion bent at an angle thereto for supporting a wreath or the like in an inclined position upon the frame member.

13. A flower holding device comprising a frame ring, supporting members carrying the frame ring to support the frame ring above the ground surface, an armed supporting member disposed below the frame ring and adjustably supported by the supporting members, and swinging engaging members on the frame ring having adjustable engagement therewith to engage or support flower holders of different diameters.

14. A flower holder comprising a frame ring, supporting means carried by and depending therefrom for engagement with the ground to hold the frame ring supported above the ground surface, a bar adapted to be secured to and extended diametrically of the frame ring with its end portions projecting beyond opposite sides of the ring, said end portions of the bar having openings therein, and auxiliary supporting members adapted to be passed through said openings and engaged with the ground and to extend above the frame ring for cooperation therewith in supporting a flower holding basket or the like.

15. A flower holding device comprising a frame ring, swinging arms adjustably mounted on the frame ring for supporting articles of different sizes thereon, and supports carried by the frame ring and depending therefrom to hold the frame ring above the ground surface.

16. A flower holding device comprising a frame ring, swinging engaging members on the frame ring having pivot openings therein for engagement with pivot members on the frame ring for adjustable engagement with the frame ring and with flower holders of different diameters, means for holding said members in adjusted holder engaging position, and supports on the frame ring projecting below the same to hold the frame ring supported above the ground surface.

In testimony whereof, I affix my signature.

WILLIAM H. SELTZER.